3,041,145
PRODUCTION OF PURE SILICON
Robert S. Aries, Stamford, Conn.
(5 bis Rue de Berri, Paris 8, France)
No Drawing. Filed July 15, 1957, Ser. No. 671,733
5 Claims. (Cl. 23—223.5)

This invention relates to the preparation of silicon in a state of extremely high purity by a reduction process. More particularly the invention concerns a novel method for the reduction of silicon halides with vapors of alkali metals or of zinc.

It is known that silicon may be prepared in the electric furnace by the reduction of silica by means of carbon in the form of coke. But in this electrothermal method at least part of the impurities present in the silica, the coke, the lining of the furnace and the electrodes enters the silicon thus prepared, which may attain a purity of about 97% and in exceptional instances may reach even 99%. However this is far too impure for some uses, especially in the electronics industry and particularly for use as a semiconducting material, or in electrical rectifiers. While such electrothermal silicon may be further purified by acid washing and other chemical treatment it is not possible to refine it to the required extent to yield what is sometimes called super-high purity silicon for the uses above mentioned.

Purer forms of silicon than the electrothermally reduced material prepared from silica have been prepared by the dissociation of silicon halides by a hot wire, or by reduction which may be accompanied by dissociation. The reducing agent most commonly used in the reduction of silicon halides has been zinc vapor, and by proper selection of raw materials silicon of fairly high purity has been obtained by the reduction of silicon tetrachloride, for example, by the reaction $$SiCl_4 + 2Zn \rightarrow Si + 2ZnCl_2$$

U.S. Patent 2,773,745 relates to the reduction of silicon tetrachloride or silicon tetrabromide by the vapors of the divalent metals zinc and cadmium.

Reduction of silicon halides has also been carried out by the use of hydrogen as the reducing agent, but as this is a reversible reaction since silicon reacts with chlorine, hydrogen chloride and chlorine compounds in general at the temperature of the formation of the silicon, a large excess of hydrogen must be used to carry away the gaseous hydrogen chloride produced to minimize the probability of the reverse reaction of silicon with such chloride. Furthermore, the temperature required imposes severe operating conditions on the materials of construction.

Undoubtedly in the zinc reduction process excess of zinc vapor is analogously needed to carry away zinc chloride vapor to minimize the reverse reaction of zinc chloride with the produced silicon.

Attempts have no doubt been made to reduce silicon halides by the use of sodium vapor but none of these has led to a commercially successful process. In U.S. Patent 2,172,969 silicon tetrafluoride is reduced by metallic sodium at about 500° C. to produce amorphous silicon of 96–97% purity, which is entirely outside of the range of purity required for silicon to be used for semi-conductors, rectifiers, diodes and various types of electronic equipment. I have found that the use of sodium vapor at 500° C. with silicon tetrachloride which is much more easily reducible than silicon tetrafluoride also does not lead to the production of a highly purified silicon. I have found that an important cause of the lack of success with sodium vapor is due to the fact that sodium vapor has never been obtained in a state of sufficient purity to yield as the final product silicon of the desired degree of purity, namely silicon with impurities limited to about 10 parts per billion, which represents silicon of a purity of 99.999999%. Even in a silicon of this degree of purity the impurities, a maximum of 10 parts per billion, must be nearly free of boron. No chemical analytical methods at present available and not even spectroscopic analysis are sensitive enough to detect impurities of this order of magnitude, but the electrical properties of silicon containing 10 or less parts of impurity per billion and substantially free of boron and other critical impurities can be evaluated for purity by the resistivity of single crystals prepared from such silicon.

Naturally, in a reduction process, the raw materials, namely the silicon halide and the metal vapor used as raw materials must be of such purity as to permit the preparation of such high purity silicon, and the materials of construction of the apparatus must be such that undesirable impurities are not picked up from them by the silicon produced therein.

In my co-pending application Serial Number 610,375, filed September 17, 1956, now abandoned, a method is described for the intensive purification of the silicon tetrachloride raw material which is equally applicable to silicon tetrabromide.

But the purification of sodium to be used as reducing agent for the reduction of silicon halides to silicon has provided a seemingly unsolvable problem. The extremely high reactivity of sodium has apparently imposed difficulties on the purification of the sodium by chemical means as any reagent capable of reacting with the impurities present in the sodium to convert them to a form in which they may be removed from the sodium reacts even more readily with the sodium itself. Physical methods of refining the sodium such as fractional distillation have hitherto not proved capable of yielding sodium of sufficiently high purity for the rigid purity requirements of a sodium agent capable of producing extremely high purity silicon from highly refined silicon tetrachloride.

It is my experience that using silicon tetrachloride of the highest purity, even that prepared by the method of my copending application previously noted, sodium of the highest purity available commercially even when further purified by fractional distillation in high vacuum or in a stream of pure dry inert gas yields on interaction with such highly purified silicon tetrachloride silicon which is not sufficiently pure for the special uses previously mentioned. With the most meticulous operation I have found it impossible to obtain by such procedure a silicon with a purity higher than that of material with an electrical resistivity lower by about two orders of magnitude than that required for use as semi-conductor material.

In accordance with the present invention, I have found surprisingly that an alkali metal, such as sodium, which has been purified to the maximum degree by the use of purest raw materials in its manufacture followed by optional treatment such as vacuum fractional distillation to further purify it, in which case it always remains still too impure to produce extremely pure silicon of the quality referred to by the reduction of purified silicon halide, can be further satisfactorily purified by passing the sodium vapor at the highest temperature which can be conveniently reached taking into consideration the materials of construction available, through a column of finely granular high purity silicon which extracts from the sodium vapor those impurities which most adversely contaminate the high purity silicon subsequently produced with it by its reducing action on silicon halides. The amount of silicon required to produce this refining of the sodium vapor is only a small part of the silicon which is subsequently produced by the action of this specially purified sodium vapor vapor produced on the silicon halide. It is always less than 10% of the total silicon produced.

As the silicon purifying mass acts only at the surface thereof to remove impurities from the vapor stream in contact with it, it is desirable to have as large a surface as possible for such reaction. I have indeed found that massive lumps of silicon such as ½ inch pieces are definitely less effective as a purifying agent for the vapors coming in contact with them than a more finely divided silicon bed. The degree of fineness is limited by the back pressure built up if a column of extremely fine material is used. Silicon which was sieved through a 30 mesh plastic screen to remove extreme fines and then through a similar 20 mesh screen to reject larger particles has proved quite satisfactory, although, of course, larger material in the form of a spatially longer charge would prove equally effective. The effective condition is the total surface of silicon to which the vapor to be purified is exposed during its contact with such purifying mass of silicon. However, for reasons of economy the silicon used for the purification of the metal vapors, and also of the silicon halide vapors, should be as finely divided as possible subject only to the condition that free flow of the vapors to be purified by passage through such purifying mass of silicon is not impeded sufficiently to cause appreciable back pressure to the vapor stream.

The purification of the sodium vapor by this method can be carried out, for example, by distilling sodium in a pure fused silica flask surmounted by a fused silica column containing pure granular silicon, leading to a fused silica flask which serves as a condenser to collect the liquid sodium and ultimately solid sodium thus purified. The condenser flask is of a design to permit its subsequent use as the distillation means for producing sodium vapor for the reduction of silicon halide to silicon.

Preferably, however, I may use the purified sodium vapor without intermediate condensation directly as the reactant for the reduction of the silicon halide.

I have furthermore found surprisingly that an analogous bed of granular extremely pure silica placed in the path of the stream of sodium vapor before the silicon purifying bed removes some of the impurities present in the sodium vapor and thus decreases the burden on the silicon mass used as a purifying agent and thus increases the useful life of the silicon purifying mass. A particularly useful form of silica for such prepurification is crushed fused silica such as may be obtained from accidentally broken fused silica ware. The fused silica is is crushed, screened to remove very fine particles and to reject oversize pieces, and the granular portion of about $1/16$ to $1/32$ inch size is successively washed with hot nitric acid, hot sulfuric acid and hot hydrochloric acid and finally exhaustively with pure distilled water and dried. However, this prepurification is not limited to the use of silica which is granular fused silica, but may be any form of pure silica such as crushed optical grade silica or selected crushed pure colorless transparent crystals free of the usual contaminants.

In addition to sodium, I have found that the other alkali metals, such as potassium and lithium also lend themselves to the purification of their vapors by means of pure silicon, or by means of pure silica and pure silicon successively. Lithium, however, offers practical operating difficulties because of its high boiling point. Although potassium has a lower boiling point than sodium, and potassium vapor may be equally as effective as sodium vapor for the reduction of silicon halides in my novel process, I have found that the metallic potassium of commerce is less pure than the metallic sodium of commerce and requires more stringent purification to become useful in my novel process. This in connection with the lower cost of sodium, especially when considered on a molal basis 39.1 parts of potassium being the equivalent of 23.0 parts of sodium, makes the use of sodium more economical.

I have found that silicon used in the purification process actually removes some material from the sodium or potassium vapor. A sample of such silicon reserved and a sample of the mass of the same batch after distillation therethrough of 100 times its weight of sodium vapor, were both subjected to identical acid treatment followed by thorough washing with distilled water, drying, and testing for resistivity by standard procedures. It was found that the silicon used in the purification process was much inferior in electrical properties and had apparently acquired impurities during its use which were not merely superficial nor removable by acid.

I have also found that the silicon halide may be extensively purified by a similar pre-treatment comprising successive treatment with finely divided silica and silicon at a temperature in the range of 900–1200° C., preferably about 1050° C.

I have also attempted to evaluate the relative importance of pretreatment of sodium vapor with pure silicon and with pure silica, and I have found that sodium vapor pretreated with silica alone is less pure than if pretreated successively with silica and silicon, while sodium vapor pretreated with silicon alone is not further improved by a subsequent treatment with silica. The clear conclusion is that silica removes only certain impurities removable by silica and additionally certain impurities not removable by silica; that silicon alone is adequate, but that pretreatment first by silica and then by silicon permits a longer useful life to the silicon used as a purifying agent and reduces the amount of silicon so used. In view of the low value or cost of the silica and the high value or cost of silicon such purification in series is economically justified, although silicon alone is fully effective.

The high temperature required in the reduction of silicon halides by sodium or potassium vapor imposes serious problems on the materials of construction, both as to the ability of the materials to function at the temperatures required and their resistance to the corrosive action of sodium vapor and silicon halides which corrosion on the other hand tends to contaminate the silicon formed therein. To reduce to whatever extent is possible the high demands on such materials of construction and to decrease the hazard of the contamination of the produced silicon it is desirable to reduce the operating temperatures as much as possible while still maintaining a temperature sufficiently high to permit the required reduction reaction to occur. The material which on the total requirements has proved best suited for the operation of reduction of silicon halides by sodium or potassium vapor is pure fused silica. This fused silica should be as boron-free as possible. It is possible to use tantalum or columbium equipment suitably shielded by inert gas blankets to prevent attack by the oxygen of the atmosphere. I have been able on a small scale to use a tantalum tube shielded by a high melting porcelain tube with air between the tubes displaced by oxygen-free argon, and the tantalum tube heated by induction to a temperature necessary for carrying out the reduction, but the difficulties of control and operation have not been sufficiently tested by me to make it desirable at the present time to conduct the reduction on the larger scale in this manner.

It is also desirable to carry out the reaction at approximately atmospheric pressure in order to avoid the additional complexities due to the necessity for control of either super-atmospheric pressure or sub-atmospheric pressure, but it is equally effective to carry out the reaction at superatmospheric pressures provided the reactants are all maintained in the vapor phase, or also at sub-atmospheric pressure.

In order to be able to control the concentration of sodium vapor I have found it advantageous in preference to controlling it by means of varying the system pressure, to control it by addition of regulated volumes of an inert pure gas such as argon or nitrogen or even of mixtures of argon and hydrogen. Such addition of inert gas or of argon and hydrogen mixtures which hydrogen mixtures may not be completely inert since the hydrogen may participate in the reduction reaction, lowers the partial vapor pressure of the sodium vapor when the total system pressure is held at approximately atmospheric.

It has been pointed out that silicon reacts at elevated temperatures with halogens and halogen derivatives, and thus renders the reduction reaction reversible. This is quite true for hydrogen chloride (produced in the hydrogen reduction process of silicon tetrachloride) and is less obvious for zinc chloride, although it is no doubt still true, and requires an excess of zinc vapor in the zinc reduction process to minimize the reversion occurring. In the case of my novel process of reduction by sodium vapor, sodium chloride is formed and to some extent sodium chloride at very high temperatures may react with silicon but the equilibrium in the reaction

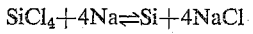

$$SiCl_4 + 4Na \rightleftharpoons Si + 4NaCl$$

is essentially in the condition represented by the right hand member of the equation. The high boiling point of sodium chloride does not permit the complete removal of sodium chloride as vapor in my present process, but the slow growth of the silicon crystals prevents inclusion of sodium chloride, which can be easily removed from the finished product by simple washing with pure water, followed by drying of the silicon produced.

However, somewhat less sodium vapor is supplied than is required by the stoichiometric relationship of the above equation in order that no excess sodium vapor may pass out of the reactor and become a source of hazard in the cooling and discharge systems. Since a slight excess of silicon tetrachloride was used it would tend to drive the above reaction toward the right. Whatever the case may be, as a practical matter it has proved quite easily possible to so conduct the reaction that no excess sodium vapor leaves the reactor, and the product within the reactor consisted entirely of silicon and sodium chloride. However, if proper precautions are taken to avoid safety hazards the reactants may be used in the exact stoichiometric ratios, or even with an excess of metal vapor which passes out at the temperatures prevailing in the reactor to the condensation and treating system and does not contaminate the silicon.

The temperature of the pretreatment of the sodium by means of pure silicon or of pure silicon preceded by pretreatment if desired by pure silica, should be as high as possible, consonant with the properties of the fused quartz equipment, in order that such pretreatment may be as vigorous as possible. However, the actual reduction of the silicon halide should be at as low a temperature within the range of suitable temperature as possible to prevent corrosion of the fused silica reactor and possible recontamination of the pure silicon formed. At temperatures above 1200° C. the silicon produced may react at least superficially with the fused silica reactor to contaminate the silicon with oxygen from the fused silica.

I have found that a suitable temperature for the pretreatment with pure silicon or with pure silica and pure silicon successively is in the range of 900 to 1200° C., and preferably 1000–1125° C. Since the boiling point of sodium is approximately 885° C. at standard atmospheric pressure and since it is undesirable to have any condensation of sodium occur anywhere within the system equipment, inert gas is preferentially added during the distillation of the sodium so that the partial pressure of the sodium vapor is decreased and its condensation point lowered. For example at 800° C. the vapor pressure of sodium is 337 mm. and if an inert gas, argon, for example, is bubbled through melted sodium held at 800° C. under conditions allowing equilibrium to be reached, the gas leaving the bubbles will have at total atmospheric pressure, a partial vapor pressure of argon of 423 mm. and a partial vapor pressure of sodium of 337 mm. From this vapor mixture of argon and sodium, the sodium will condense out only at temperatures below 800° C., the vapor mixture will be saturated with sodium at 800° C. and will be in a state of superheat above 800° C.

I have found further that a suitable temperature for the reduction of silicon tetrachloride with sodium or potassium vapor is in the range of 800 to 1150° C., and preferably from about 925–1000° C. The lower temperatures of the useful range tend to produce more of the silicon in the form of finely divided material, while higher temperatures in the useful range tend to produce more of the silicon in larger crystalline form.

Silicon tetrabromide may be reduced by the identical procedure used for silicon tetrachloride with quite comparable results. There appears to be some evidence from experimental results that the reduction of silicon tetrabromide may be carried out at a temperature perhaps 30–50° C. lower than in the case of silicon tetrachloride, but the much higher cost of raw material, both per pound, and also even more so per pound of silicon contained, in the case of the bromide, has led me to decide for economic reasons on silicon tetrachloride as the preferred raw material. This additional cost with respect to silicon tetrabromide as raw material may possibly be overcome by adequate recovery procedures to recover all bromine-containing byproducts and waste products, which is a conventional chemical engineering problem, but to which I have devoted no particular attention in developing my process.

I have also found that trichlorosilane may be used as the silicon halide for reduction by operating under my standard silicon tetrachloride conditions, and a run made at 900° C. was equally successful. But at present silicon tetrachloride is commercially obtainable as a reasonable price, while trichlorosilane is much more expensive since it is produced in smaller quantities. If this relationship as to price and availability should change trichlorosilane might prove to be a desirable raw material for the production of pure silicon.

I have also used zinc vapor from the purest commercial zinc available, and have prepurified this vapor by passing it at 1150° C. successively over purified granular fused silica and granular purified silicon and have then caused it to react with similarly purified silicon tetrachloride at 975° C. and have obtained a mixture of granular and crystalline silicon with a satisfactory resistivity of 200 ohm-centimeters or higher, whereas under similar operating conditions omitting the prepurification by means of granular fused silica and granular purified silicon the resistivity of the silicon obtained was less by more than one order of magnitude, indicating the effectiveness of my novel method of purifying metallic vapor used in the reduction of silicon halides to produce high purity silicon.

Having thus presented the general principles and observations relating to my novel process for the production of high purity silicon, I shall describe the operation of the process in detail in accordance with the following illustrative, but not limiting, examples.

*Example 1*

Pure commercial sodium was distilled in a fused quartz flask using a similar flask as condenser, and passing a slow current of purified argon therethrough to assist in the vaporization. The first 10% distillate was collected and rejected. Then with a fresh condensing flask the next 80% of the sodium charge was distilled over and collected as condensate. The thus fractionated sodium in the silica flask was then held at 750° C. and purified argon was bubbled through, and the vapor mixture was passed through a charge of granular fused silica in a silica tube followed by passage through a charge of granular pure silicon in a silica tube, said silica tubes containing granular fused quartz and granular pure silicon being heated to 1050° C. Silicon tetrachloride of the highest purity contained in a fused silica flask was boiled with a current of argon passing therethrough and the vapor passed through a tube of fused silica containing a charge of granular fused silica, followed by a fused silica tube containing a charge of granular pure silicon, said silica tubes containing the charges of granular fused silica and granular pure silicon in series being heated to 1050° C. These two vaporizing systems, respectively for sodium and for silicon tetrachloride were connected by suitable fused silica ducts with a separate fused silica reaction chamber held at a temperature of 950° C. which had previously been completely purged of air by a stream of oxygen-free argon. The vapors from the vaporizing systems after passing through the prepurifying charges of granular fused silica and granular pure silicon were as indicated passed through fused silica ducts in which some cooling occurred which was however controlled by shaped asbestos insulation so that the two vapors entered the reaction chamber at approximately 950° C. The rate of sodium vapor feed to the reactor was adjusted so that the silicon tetrachloride was always in slight excess. The vapor phase reaction occurred in said reaction chamber which was provided with a vent tube through which the slight excess of silicon tetrachloride and the inert gas passed to a cooling chamber and finally to a discharge system. After six hours operation the heat was removed from the sodium distillation flask while argon was still being run in. When the temperature had dropped to 300° C. in the sodium distillation flask and no more sodium vapor was being carried over, the silicon tetrachloride distillation was discontinued, so that only argon was being passed into the reactor; then the entire system was allowed to cool, and the product contained in the reactor was carefully removed. It was then washed with conductivity water until completely free of chlorides, and then dried. The product was silicon of a purity in excess of 99.999%. The resistivity was in excess of 100 ohm-centimeters.

*Example 2*

Purest commercial potassium was distilled in a fused quartz flask using a similar flask as condenser and passing a slow current of purified argon therethrough to assist in the vaporization. The first 25% of distillate was collected and rejected. Then with a fresh condensing flask the heart cut of 50% of the potassium charge was distilled over and collected as condensate. The thus fractionated potassium in the silica condensation flask was then held at 750° C. and purified argon was bubbled through and the vapor mixture was treated as in Example 1. Silicon tetrachloride was then distilled as in Example 1. The two vapor streams of potassium and argon, and silicon tetrachloride and argon respectively, purified by passage over granular fused quartz and granular pure silicon respectively were reacted in the fused silica reaction chamber at 920° C. Otherwise the reduction was carried out as in Example 1. The silicon product was washed as before with conductivity water until free of chlorides, and dried. The final silicon product after washing and drying was of a purity in excess of 99.999% and consisted approximately 50% of needle-shaped crystals and approximately 50% of powdered and granular material. Both the crystalline and powdered material were of equal purity.

*Example 3*

This was run similarly to Example 1, except that purified trichlorosilane, $SiHCl_3$, was used as the silicon halide. This was not passed over prepurifying beds of granular fused silica and granular silicon, but was passed directly to the reaction chamber to be reacted with sodium vapor diluted with pure argon. However, the sodium vapor was purified as in Example 1. The reactor was held at 915° C. The operation was otherwise as in Example 1. The product was similarly purified by washing and drying. The final pure silicon product had a purity in excess of 99.999%.

*Example 4*

This was run similarly to Example 1, except that the "inert" gas was a mixture in equal volumes of pure hydrogen and argon. The same temperature conditions were used as in Example 1, and the product after refining appeared identical.

*Example 5*

In this run commercial zinc metal indicated to be of a purity of 99.999% was distilled from a fused silica flask. The zinc was held at just above 900° C. and a current of argon was passed through to assist vaporization. Both the zinc vapor and the silicon tetrachloride vapor were further purified as in Example 1 by passage over granular fused silica and granular pure silicon successively, both treatments being at 1050° C. The temperature in the reactor was held at 990° C., and in this case the zinc was used in 5% stoichiometric excess over the silicon tetrachloride. At the termination of the reaction pure argon was passed through the reactor still held at 990° C. to remove any residual amounts of zinc and zinc chloride by vaporization. Upon cooling and removing the product it was found to be pure silicon with a purity in excess of 99.999%. The product contained no detectable chloride. Spectroscopic examination of both the crystals and powder showed freedom from zinc.

*Example 6*

This was run precisely as Example 1 except that highly purified silicon tetrabromide was used instead of silicon tetrachloride. The silicon tetrabromide was purified by fractionating in an all fused quartz apparatus with a packed column containing crushed fused quartz as packing material, and equivalent to 12 theoretical plates in fractionating efficiency. The silicon tetrabromide was fractionated at a 10:1 reflux ratio and the 50% heart cut was used in the reduction. The silicon tetrabromide vapor to be reduced was passed over granular fused quartz and granular pure silicon as in Example 1, but the temperature was 950° C. Argon was used to "carry" the sodium vapor and the silicon tetrabromide vapor, the sodium vapor being prepurified as in Example 1. The reactor was held at 930° C. After a run of 6 hours as in Example 1, the run was finished by allowing the liquid sodium in the vaporizer to cool to 200° C. with argon still flowing through, the silicon tetrabromide distillation was stopped, and the reactor still held at 930° C. was flushed with argon alone for 30 minutes and then was allowed to cool with argon flowing through it, until the temperature had dropped to 100° C. Then the contents were removed and were found to be a mixture of granular and needle-shaped crystals of silicon. After washing with conductivity water until the washings were free of bromides, the silicon was dried and found to be of purity in excess of 99.999%.

*Example 7*

This was run like Example 1, except that the reactor was a tantalum tube which slid into a fused silica tube. The tantalum tube was in two equal parts each with a flanged end so that when both halves were slid into the fused silica tube it constituted a practically continuous single tantalum tube, fitting loosely within a fused silica tube. The tantalum tube was joined to the fused silica ducts bringing the vapor to it by having the ends of the silica ducts thickened to form flanges, and grinding the contact faces of the silica flanges to flatness. The silica flanges and the tantalum flanges were held together by spring clamps and were sufficiently tight. A current of argon was passed through a nozzle in the wall of the protective fused silica tube so that the tantalum was protected by a blanket of argon. The heating was by induction and after a series of trials it was found possible to determine the conditions for which the central portion of the reactor was held at about 975° C. The operation of reduction of silicon tetrachloride by sodium vapor in this apparatus with only the middle half of the tantalum tube held at about 975° C. yielded pure silicon in this middle half which after removal from the tantalum tube, exhaustive washing with conductivity water until the washings were free of chlorides, was of sufficient purity to be useful for semi-conductor use.

It will be understood that suitable modifications may be made in this disclosed invention without departing from the spirit thereof, and within the scope of the appended claims.

I claim:

1. The method of preparing very high purity crystalline silicon by reduction of a silicon halide which comprises the steps of vaporizing a silicon halide, purifying said silicon halide vapor by contacting it in direct succession with finely divided silica and finely divided silicon at a temperature between about 900° and about 1200° C., and then reacting said purified silicon halide vapor with the vapor of a metal selected from the group consisting of the alkali metals and zinc in the presence of a pure inert gas at a temperature between about 800° and about 1150° C., and recovering the liberated silicon in crystalline form.

2. In the method of preparing very high purity crystalline silicon by reduction of a silicon halide which includes vaporizing a silicon halide, purifying the silicon halide vapor by contacting it in direct succession with finely divided silica and finely divided silicon at a temperature between about 900° and about 1200° C., and then reacting the purified silicon halide vapor with the vapor of a metal selected from the group consisting of the alkali metals and zinc in the presence of a pure inert gas at a temperature between about 800° and about 1150° C., the step which comprises employing as the reducing agent the vapor of a metal selected from the group consisting of the alkali metals and zinc which has been contacted in direct succession with finely divided silica and finely divided silicon at a temperature between about 900° and about 1200° C.

3. The method of claim 2 in which the alkali metal is sodium.

4. The method of claim 1 in which the silicon halide is silicon tetrachloride.

5. The method of claim 1 in which the alkali metal is sodium.

References Cited in the file of this patent

UNITED STATES PATENTS

| 2,172,969 | Eringer | Sept. 12, 1939 |
| 2,456,935 | Fisher | Dec. 21, 1948 |
| 2,804,377 | Olson | Aug. 27, 1957 |
| 2,805,133 | Olson | Sept. 3, 1957 |

FOREIGN PATENTS

| 741,630 | Great Britain | Dec. 7, 1955 |